United States Patent Office 3,184,507
Patented May 18, 1965

3,184,507
FLUORO-ACETYL UREAS
Otto Scherer, Frankfurt am Main, and Günter Schneider, Buchschlag, Germany, assignors to Farbwerke Hoechst Aktiengesellschaft vormals Meister Lucius & Brüning, Frankfurt am Main, Germany, a corporation of Germany
No Drawing. Filed May 16, 1961, Ser. No. 110,347
Claims priority, application Germany, May 28, 1960, F 31,327
19 Claims. (Cl. 260—553)

The invention relates to fluoro-acetyl ureas and their application as insecticides.

We have found that fluoro-acetyl ureas of the general formula $$FCH_2-CO-NH-CO-NHR$$

wherein R means an aliphatic, cycloaliphatic, araliphatic or aromatic radical or the radical of an organic acid, can be prepared by reacting a monofluoro-acetyl halide with ureas of the general formula $$H_2N-CO-NHR$$

wherein R has the meaning given above, or by reacting monofluoro-acetamide with isocyanates of the general formula $$OCN-R$$

wherein R has the meaning given above, or with compounds which under the reaction conditions form isocyanates.

We have likewise found that N-monofluoro-acetyl-N'-monofluoro-acetamidomethyl urea and N,N'-bis-(monofluoro-acetyl)-urea can be prepared by reacting monofluoro-acetamide with bromine in sodium hydroxide solution and with oxalyl chloride respectively.

Furthermore, the invention relates to the use of fluoro-acetyl ureas of the general formula $$FCH_2-CO-NH-CO-NHR$$

wherein R means hydrogen, an aliphatic, cycloaliphatic, araliphatic or aromatic radical, or the radical of an organic acid, as insecticidal, acaricidal, ovicidal and fungicidal agents.

Fluoro-acetyl ureas are prepared advantageously from monofluoro-acetyl halide or monofluoro-acetic anhydride and mono-substituted ureas by heating the components in an inert solvent, e.g., benzene, toluene, chloro-benzene, if desired under reflux, separating the product, if necessary following precipitation with, e.g., petroleum ether and recrystallizing it.

The exothermic reaction of monofluoro-acetamide with isocyanates is carried out by heating the reactants to a temperature in the range of 100° to 200° C. In order to avoid possible local overheatings it may be advantageous to carry out the reaction by heating in an inert solvent, e.g., in benzene, toluene, chlorobenzene, dioxane or tetrahydrofurane.

Instead of the isocyanates there may also be used compounds which under the above conditions form isocyanates. Carbamic acid chlorides are mentioned by way of example.

It is surprising that bromine in sodium hydroxide solution does not act on monofluoro-acetamide analogously to the Hoffman decomposition, but as follows:

$$3CH_2F.CO.NH_2 \xrightarrow{Br_2.NaOH} CH_2F.CO.NH.CO.NH.CH_2.NH.CO.CH_2F$$

with formation of N-monofluoro-acetyl-N'-monofluoro-acetamidomethyl urea, comprising probably the addition of one molecule of monofluoro-acetamide to the intermediately formed monofluoro-methyl isocyanate. The urea derivative so formed is unstable under the reaction conditions, separates hydrofluoric acid, and adds another molecule of monofluoro-acetamide.

The reaction of monofluoro-acetamide with oxalyl-chloride is suitably carried out in a molar ratio of about 2:1 in an inert solvent, e.g., benzene or toluene, by heating under reflux. Probably also in this case—perhaps by splitting off formylchloride—the corresponding isocyanate is formed to which a second molecule of monofluoro-acetamide adds.

The fluoro-acetyl ureas may be used according to the invention in the form of solutions or suspensions for the control of pests. Suitable solvents among others are alcohols such as methanol, ethanol, propanol or isopropanol, ketones such as acetone, and dimethyl-formamide. On the other hand, the urea derivatives can be also applied in the form of solid or liquid preparations, e.g., as wettable powders, dusts, and emulsion concentrates.

As additives for the formation of solid preparations, there may be used colloid protectives and dispersing agents, e.g., cell pitch (sodium or calcium lignine sulfonate), wetting agents, e.g., alkylaryl sulfonate, polyoxethylated alkyl phenols or fatty acid methyltaurides, and inert substances, e.g., active silicic acid, talcum, and kaolin. For the preparation of liquid formulations a non-ionogenic wetting agent, e.g., an oxyethylated alkylphenol, an oxyethylated alcohol or ester or an oxyethylated carboxylic acid, or an ionogenic wetting agent, e.g., the calcium salt of an alkylaryl sulfonic acid, or a mixture of both wetting agents, is added to the active substance in addition to the solvent or diluent.

As examples of active substances according to the invention there are mentioned:

N-monofluoro-acetyl urea, N,N'-bis-monofluoro-acetyl urea, N-monofluoro-acetyl-N'-methyl urea, N-monofluoro-acetyl-N'-pentyl urea, N-monofluoro-acetyl-N'-undecyl urea, N-monofluoro-acetyl-N'-octadecyl urea, N-monofluoro-acetyl-N'-2-methyl propyl urea, N-monofluoro-acetyl-N'-monofluoro-acetamido methyl urea, N-monofluoro-acetyl-N'-β-chlorethyl urea, N-monofluoro-β-phenyl ethyl urea, N-monofluoro-acetyl-N'-benzyl urea, N-monofluoro-acetyl-N'-allyl urea, N-monofluoro-acetyl-N'-cyclohexyl urea, N-monofluoro-acetyl-N'-phenyl urea, N-monofluoro-acetyl-N'-p-chlorophenyl urea, N-monofluoro-acetyl-N'-p-nitrophenyl urea, N-monofluoro-acetyl-N'-tolyl urea, N-monofluoro-acetyl-N'-p-tertiary butyl-phenyl urea, and N-monofluoro-acetyl-N'-p-tolyl-sulfonyl-urea.

It is to be noted that the fluoro-acetyl ureas prepared according to the present invention as well as their formulations can be applied in combination with other insecticides or fertilizers.

The following examples illustrate the invention but they are not intended to limit it thereto:

EXAMPLE 1

*N-monofluoro-acetyl urea*

(a) A benzene solution of 1 mole of monofluoro-acetamide and 1 mole of N-carbonyl sulfamic acid chloride are heated weakly and the crystal mass formed is decomposed with water. After recrystallization from ethanol the yield amounts to about 30% of the theoretical yield. Melting point: 210° to 211° C. (decomposition).

Calculated: C, 30.0%; H, 4.17%; N, 23.35%. Found: C, 30.6%; H, 4.5%; N, 23.0%.

(b) A benzene solution of 1 mole of monofluoro-acetyl chloride and 1 mole of urea is heated under reflux. After the evaporation of hydrochloric acid, the reaction product is separated and recrystallized from methanol. The yield amounts to about 35% of the theoretical. Melting point: 210 to 211° C. (decomposition).

Calculated: N, 23.35%. Found: N, 23.1%.

EXAMPLE 2

*N,N'-bis-monofluoro-acetyl urea*

A benzene solution of 1 mole of monofluoro-acetamide and 0.5 mole of oxalyl chloride is heated under reflux and after cooling, filtration and recrystallization from water, the above cited compound is obtained in a yield of 40% of the theoretical yield. Melting point: 154° C.
Calculated: N, 15.55%. Found: N, 15.1%.

EXAMPLE 3

*N-monofluoro-acetyl-N'-methyl urea*

A solution of 1 mole of monofluoro-acetamide and 1 mole of methylisocyanate was heated in chlorobenzene and after cooling and recrystallization from chlorobenzene/methanol (2:1) the above identified urea was obtained in a yield of about 30% of the theoretical yield. Melting point: 189 to 190° C.
Calculated: N, 20.9%. Found: N, 20.9%.

EXAMPLE 4

The monofluoro-acetyl urea derivatives of the general formula $$FCH_2—CO—NH—CO—NHR$$

the characteristics of which are given in the following table, were prepared by heating equinmolar quantities of the isocyanate indicated in column 1 and of monofluoro-acetamide to temperatures in the range of 100° to 150° C.

| Isocyanate R—NCO R= | Yield* | Recrystallized | Melting point | Analysis Calcul. | Analysis Found |
|---|---|---|---|---|---|
| n-Pentyl | About 50% | Methanol/water | 96–98° | 14.7% N | 14.4% N. |
| Undecyl | About 65% | Methanol | 91–94° | 10.2% N | 10.9% N. |
| Octadecyl | About 55% | do | 97–98° | 7.5% N | 7.2% N. |
| 2-methylpropyl | About 35% | Methanol/water | 117–118° | 15.9% N | 15.7% N. |
| β-Chlorethyl | About 30% | Methanol | 142–143° | 15.3% N | 15.3% N. |
| β-Phenylethyl | About 40% | do | 124–126° | 12.5% N | 12.3% N. |
| Benzyl | About 35% | Methanol/water | 145–147° | 13.3% N | 13.3% N. |
| Allyl | About 40% | do | 104–106° | 17.5% N | 17.5% N. |
| Cyclohexyl | About 70% | (a) Chlorobenzene (b) Methanol/water | 135–137° | 13.9% N | 13.9% N. |
| Phenyl | About 80% | Chlorobenzene | 159–161° | 14.3% N / 12.5% N | 14.1% N. / 12.2% N. |
| p-Chlorophenyl | About 85% | do | 183–184° | 15.4% Cl | 15.5% Cl. |
| p-Nitrophenyl | About 75% | Nitrobenzene | 225–227° | 17.4% N | 17.3% N. |
| p-Tolyl | About 70% | (a) Chlorobenzene (b) Methanol | 177–179° | 13.3% N | 13.3% N. |
| p-Tert.butylphenyl | About 65% | Methanol | 174–175° | 11.3% N | 11.1% N. |
| p-Tolylsulfonyl | About 50% | do | 158–161° | 11.7% S | 10.5% S. |

*The yields refer to the pure product.

EXAMPLE 5

*N-monofluoro-acetyl-N'-monofluoro-acetamido methyl urea*

A solution of monofluoro-acetamide, bromine and sodium hydroxide solution of 20% strength (molar ratio 1:0.55:1), prepared at the temperature of 0° C., is heated to about 80–100° C. The crude product which precipitates after cooling is recrystallized from methanol. The yield amounts to 45% of the theoretical yield. Melting point: 188° to 180° C.
Calculated: C, 34.5%; H, 4.31%; N, 20.1%; $CH_2F.CO$, 58.4%. Found: C, 34.7%; H, 4.5%; N, 19.9%; $CH_2F.CO$, 57.0%.

EXAMPLE 6

When plants infested with plant-lice, e.g., celery with *Dysaulacorthum vincae*, are sprayed with a 0.0085% suspension of a preparation containing 25% of N-monofluoro-acetyl-N'-phenyl urea, monofluoro-acetyl urea, N,N'-bis-monofluoro-acetyl-urea or N-monofluoro-acetyl-N'-4-chlorophenyl urea, 64% of active silicic acid, 10% of cell pitch and 1% of fatty acid methyltauride, all plant-lice are destroyed.

EXAMPLE 7

The systemic effects on pests of the active substances identified in Example 6 can be proved by surrounding the stems of plants infested with plant-lice (e.g., *Vicia faba* with *Doralis fabae*) 1–2 cm. above the soil with a cotton-wool bandage wrapped in cellophane, the cotton-wool bandage having been impregnated with 1 milliliter of an aqueous dilution of 0.1% strength of an agent having the compositions described in Example 6. The plant-lice occurring at the upper parts of the plants will perish within 3 days.

EXAMPLE 8

All development stages of shield-lice (e.g., *Lecanium hesperidum*) are destroyed within 2 days after having sprayed the infested plants with a suspension of 0.06% strength of a formulation containing 25% of N-monofluoro-acetyl-N'-phenyl urea, N-monofluoro-acetyl urea or N,N'-bis-monofluoro-acetyl urea, 64% of active silicic acid, 10% of cell pitch and 1% of fatty acid methyltauride.

EXAMPLE 9

When bean plants that are strongly infested with mites are sprayed with a suspension of 0.2% strength of a formulation as described in Example 8, all mite stages, even the mite eggs, are destroyed.

EXAMPLE 10

Ticks or medium size *Ornithodorus moutaba* are destroyed within 48 hours by a treatment with a 0.4% suspension of a wettable powder containing 25% of N-monofluoro-acetyl-N'-phenyl urea, 74% of active silicic acid, and 1% of fatty acid methyltauride.

EXAMPLE 11

When water infested with Aëdes larvae and containing useful fish is mixed with an alcoholic solution of 25% strength of N-monofluoro-acetyl-N'-phenyl urea in such a manner that the water contains 10 p.p.m. of the active substance, all Aëdes larvae are destroyed after about 20 minutes, whereas the useful fish remain uninjured.

EXAMPLE 12

Cockroaches of the type *Phyllodromia germanica* are destroyed within a short time by a 0.6% spray liquor prepared from a wettable powder containing 25% of N-monofluoro-acetyl-N'-monofluoro-acetamido methyl urea, 64% of the active silicic acid, 10% of cell pitch, and 1% of fatty acid methyltauride.

EXAMPLE 13

When cockroaches are placed on a plate previously treated with a dust consisting of 10% of N-monofluoroacetyl-N'-tolylsulfonyl urea and 90% of talcum at a rate of 6.6 grams/square-meter corresponding to 66 kilograms/10,000 square meters the cockroaches are killed.

EXAMPLE 14

Ticks of the type *Ornithodorus moutaba* are killed by a 0.6% aqueous suspension of a wettable powder consisting of 25% of N-monofluoro-acetyl-N'-cyclohexyl urea, 64% of active silicic acid, 10% of cell pitch, and 1% of fatty acid methyltauride.

EXAMPLE 15

Cockroaches of the type *Phyllodromia germanica* are destroyed by a 0.15% aqueous suspension of a wettable powder which consists of 25% of N-monofluoro-acetyl-N'-allyl urea, 64% of active silicic acid, 10% of cell pitch, and 1% of fatty acid methyltauride.

EXAMPLE 16

Ticks of the type *Ornithodorus moubata* are killed by a 0.3% aqueous suspension of a wettable powder consisting of 25% of N-monofluoro-acetyl-N'-2-methyl-propyl urea, 64% of active silicic acid, 10% of cell pitch, and 1% of fatty acid methyltauride.

EXAMPLE 17

Cockroaches of the type *Phyllodromia germanica* are killed by an aqueous suspension ready for spraying and which is prepared from a wettable powder consisting of 25% of N-monofluoro-acetyl-N'-octadecyl urea, 63% of active silicic acid, 10% of cell pitch, and 2% of fatty acid methyltauride.

EXAMPLE 18

Ticks of the type *Ornithodorus moubata* are killed by a 0.7% aqueous suspension of a wettable powder consisting of 25% of N,N'-bis-monofluoro-acetyl urea, 64% of active silicic acid, 10% of cell pitch, and 1% of fatty acid methyltauride.

EXAMPLE 19

When bean plants infested with mites (*Tetranychus urticae*) are sprayed with a 0.2% dilution of a preparation which contains 25% of N-monofluoro-acetyl-N'-2-methyl propyl urea, N-monofluoro-acetyl-N'-allyl urea or N-monofluoro-acetyl-N'-cyclohexyl urea, 64% of active silicic acid, 10% of cell pitch, and 1% of fatty acid methyltauride, all stages of mites including eggs are killed.

EXAMPLE 20

When applying 60 p.p.m. of N,N'-bis-monofluoro-acetyl urea or N-monofluoro-acetyl-N'-phenyl urea, the outbreak of disease in vines infected with Peronospora is entirely prevented.

We claim:
1. A compound of the formula

$$FCH_2-CO-NH-CO-NHR$$

in which R represents a member of the group consisting of alkyl of 1 to 18 carbon atoms, allyl, benzyl, phenylethyl, cyclohexyl, chloroethyl, phenyl, chlorophenyl, nitrophenyl, lower alkyl phenyl, tolyl sulfonyl, monofluoroacetyl and monofluoroacetylamidomethyl.
2. N,N'-bis-monofluoro-acetyl-urea.
3. N-monofluoro-acetyl-N'-methyl-urea.
4. N-monofluoro-acetyl-N'-n-pentyl-urea.
5. N-monofluoro-acetyl-N'-undecyl-urea.
6. N-monofluoro-acetyl-N'-octadecyl-urea.
7. N-monofluoro-acetyl-N'-2-methylpropyl-urea.
8. N-monofluoro-acetyl-N'-β-chloroethyl-urea.
9. N-monofluoro-acetyl-N'-β-phenylethyl-urea.
10. N-monofluoro-acetyl-N'-benzyl-urea.
11. N-monofluoro-acetyl-N'-allyl-urea.
12. N-monofluoro-acetyl-N'-cyclohexyl-urea.
13. N-monofluoro-acetyl-N'-phenyl-urea.
14. N-monofluoro-acetyl-N'-p-chlorophenyl-urea.
15. N-monofluoro-acetyl-N'-p-nitrophenyl-urea.
16. N-monofluoro-acetyl-N'-p-tolyl-urea.
17. N-monofluoro-acetyl-N'-p-tert.butylphenyl-urea.
18. N-monofluoro-acetyl-N'-p-tolylsulfonyl-urea.
19. N-monofluoro-acetyl - N' - monofluoro-acetamido-methyl-urea.

References Cited by the Examiner
UNITED STATES PATENTS

| | | | |
|---|---|---|---|
| 2,562,863 | 7/51 | Hoegberg | 260—553 |
| 2,801,200 | 7/57 | Hackmann | 167—22 |

FOREIGN PATENTS

| | | |
|---|---|---|
| 162,857 | 5/55 | Australia. |

IRVING MARCUS, *Primary Examiner.*
WALTER A. MODANCE, *Examiner.*